Oct. 2, 1962     E. W. BROWN ET AL     3,056,428
SAP COLLECTING TUBE
Filed March 31, 1959
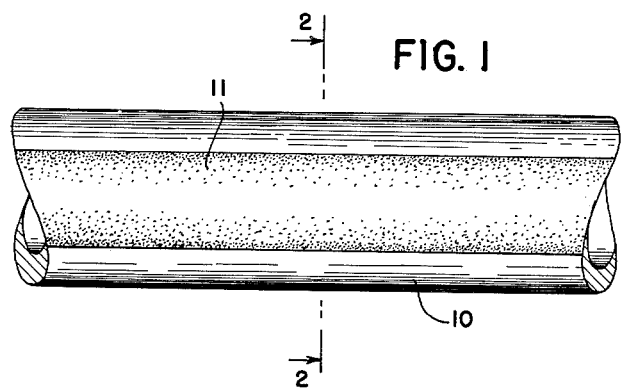
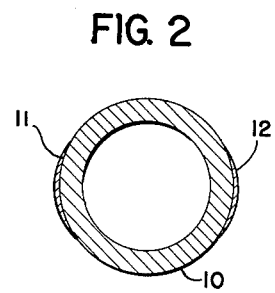
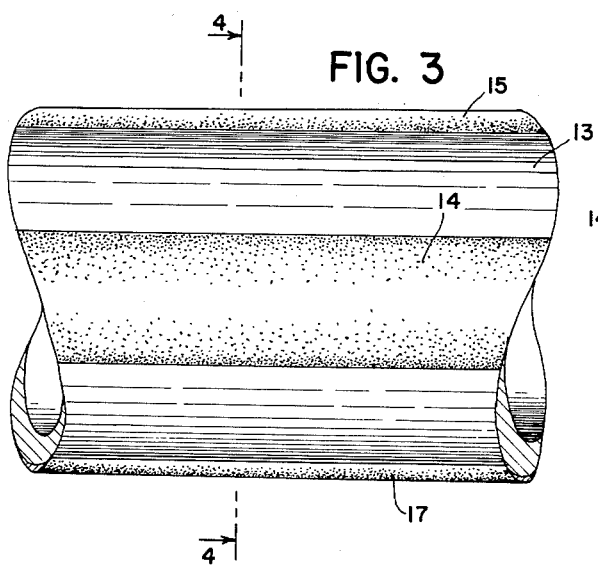
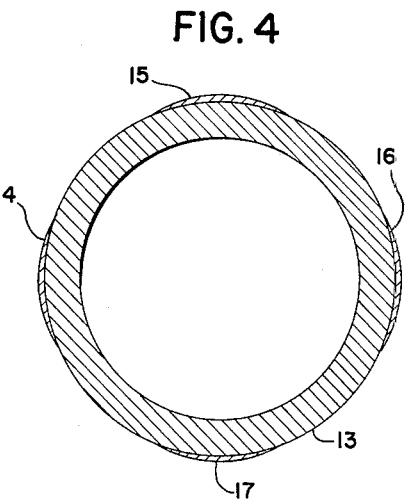
INVENTORS
ERWIN W. BROWN
EDWARD G. BUDNICK
BY
Carpenter Abbott Coulter & Kenney
ATTORNEYS

United States Patent Office 3,056,428
Patented Oct. 2, 1962

3,056,428
SAP COLLECTING TUBE
Erwin W. Brown, North Oaks, Minn., and Edward G. Budnick, Scotch Plains, N.J., assignors to Minnesota Mining and Manufacturing Company, St. Paul, Minn., a corporation of Delaware
Filed Mar. 31, 1959, Ser. No. 803,258
6 Claims. (Cl. 138—118)

This invention relates to tubing particularly suited for use in sap collecting apparatus or the like and to the method of making such tubing.

Recent developments in the art of collecting sap from maple trees have proceeded in the direction of closed systems in which the sap is conducted from the spiles to a reservoir through a sap collecting apparatus comprising a network of plastic tubes. A network of this type may comprise main trunk as well as branch lines from which tributary lines lead to the spiles. Experience has shown that this type of arrangement has many advantages and results in increased production, a higher grade of product and substantially lower labor costs.

Because of the nature of maple sap and the circumstances under which the sap must be collected, certain problems must be overcome and others must be minimized in order to run an efficient sap collecting operation of the type aforedescribed. A problem which can be serious in the operation of such a closed sap collecting system is gnawing attacks on the plastic tubing by rodents such as squirrels, porcupines, and mice. Not only is perforation or severing of a tube likely to cause the loss of substantial quantities of sap, but it also opens the system to serious contamination, particularly by bacteria carried in the mouth of the rodent. Moreover, opening of the system by rodent attack also exposes the sap in the system to the air, thus hastening bacterial action tending to discolor and lower the quality of the sap.

Another problem to be faced in the collection of sap by means of a system as aforedescribed is that of freezing of the sap in the tubing. Freezing may take place, for example, at night during a period of low or no sap pressure and flow, whereas the resumption of higher sap pressure and flow may occur shortly after sunrise, before the sap in the tubing is thawed out. While dilation of the plastic tubing permits some warm sap flow through the portions thereof containing frozen sap, the resistance to such warm sap flow presented by the frozen sap in the tubing reduces the amount collected at such times to a fraction of the sap available at the spiles. This uncollected sap travels up the tree trunks and is lost as far as collection thereof is concerned.

In the light of the foregoing remarks, the present invention has as one of its principal objects the provision of an improved tubing for use in a sap collection system or the like which is roden repellent in nature and therefore not subject to gnawing attacks.

Another object of the invention is to provide an improved tubing of the aforementioned character having transparent and radiant-energy-transmissive portions permitting observation and ultraviolet irradiation of the contents of said tubing, said irradiation retarding bacterial action in the sap within such tubing.

Another object of the invention is to provide an improved tubing of the class described which also has infrared absorptive portions which, upon exposure to the sun's rays, generate heat tending to prevent freezing of sap therein and to thaw any sap therein which may have been frozen.

A further object of the invention is to provide an improved method of making tubing of the character aforementioned.

Still another object of the invention is to provide an improved tubing of the aforedescribed character which is inexpensive, safe, resistant to deterioration by exposure to solar radiation, and otherwise well adapted for the purposes described.

Other and further objects of the invention will become apparent as the description proceeds, reference being had to the drawing accompanying and forming a part of this specification, wherein:

FIGURE 1 is a fragmentary side elevational view of one form of tubing constructed in accordance with the present invention;

FIGURE 2 is a transverse sectional view taken along the line II—II of FIGURE 1;

FIGURE 3 is a fragmentary side elevational view of another form of tubing constructed in accordance with the present invention; and FIGURE 4 is a transverse sectional view taken along the line IV—IV of FIGURE 3.

FIGURES 1 and 2 illustrate the improved tubing structure preferred for use in tributary lines having, for example, an internal diameter of ¼ inch. In FIGURES 1 and 2 the numeral 10 indicates a tubular substantially cylindrical body of flexible resilient transparent radiant-energy-transmissive plastic or polymeric material, for example polyvinyl chloride. Disposed on diametrically opposite sides of and fused to the outer surface of the tubular body 10 so as to be integral therewith are relatively thin longitudinally extending bands 11 and 12 which are conveniently made of the same flexible plastic material as the body 10. The plastic material of the bands 11 and 12 preferably has incorporated therein a rodent repellent material as well as an infrared absorptive material. In the preferred form of the invention the rodent repellent material in the bands 11 and 12 takes the form of N-alkyl phthalimide in which the alkyl group may include from one to eight carbon atoms. The rodent repellent is present in the amount of from 2 to 15 percent by weight of the polyvinyl chloride in said bands. Carbon black is the infrared absorptive material preferred for incorporation into the bands 11 and 12, and it is preferably present in the amount of 0.25 to 10.0 percent by weight of the polyvinyl chloride in said bands. As shown most clearly in FIGURE 2, each of the bands 11 and 12 preferably has a width substantially equal to ⅙ of the outer circumference of the tubular body 10.

FIGURES 3 and 4 illustrate the improved tubing structure preferred for use in branch and trunk lines, for example tubing having internal diameters of ½ inch, ¾ inch and 1 inch. In FIGURES 3 and 4 a substantially cylindrical tubular body 13 is preferably formed of a radiant-energy-transmissive plastic or polymeric material which is somewhat more rigid than the material of the tubular body 10 of FIGURES 1 and 2. More specifically, polyethylene is preferred for use in the tubular body member 13. Integral with and fused to the external surface of the tubular body 17 are relatively thin longitudinally extending bands 14, 15, 16 and 17 corresponding to the bands 11 and 12 shown in FIGURES 1 and 2. The bands 14 to 17 each have a width preferably equal to ⅛ the outer circumference of the tubular body 13 and are equally spaced as shown. The bands 14 to 17 are conveniently formed of the same plastic material as the tubular body 13 and may have incorporated therein the same rodent repellent material and infrared absorptive material as the bands 11 and 12 of FIGURES 1 and 2. The bands 14 to 17 preferably contain the rodent repellent N-alkyl phthalimide in the amount of 2 to 15 percent by weight of polyethylene therein and carbon black in the amount of 0.25 to 10.0 percent by weight of said polyethylene.

The use of the rodent repellent N-alkyl phthalimide in the amounts indicated in the bands 11, 12 and 14 to 17 provides sufficient rodent repellency to protect the improved tubing from gnawing attacks. By having the rodent repellent material incorporated in the relatively thin bands fused to the exterior of the tubular bodies 10 and 13, the sap within the tubing is completely isolated from the rodent repellent material. Moreover, such use of the rodent repellent material affords maximum repellency for the amount of material since the repellent is present only in the exterior of the tube. While N-alkyl phthalimide is preferred for use as the rodent repellent material in the bands 11, 12 and 14 to 17, other suitable materials may be used. The characteristics required of a rodent repellent material suitable for use in the tubing of the present invention are insolubility in water, a low order of toxicity, thermal stability up to 350° F., nonirritating, and resistant to deterioration by solar radiation.

The use of carbon black or other suitable infrared absorptive materials in the bands 11, 12 and 14 to 17 has the advantageous effect of absorbing heat as soon as said bands are struck by the sun's rays or by infrared rays from any other source. Thus, in the event that sap is frozen in the tubing, for example at night, the heat absorbed in the bands 11, 12 and 14 to 17 upon being struck by the rays of the morning sun tends to thraw the frozen sap and clear the lines for maximum sap flow with a minimum of delay. This is important, since as aforementioned, blockage of the lines by frozen sap creates resistance to sap flow which prevents extraction from the trees of all of the sap available to the sap collecting network. The sap which does not enter the sap collecting network passes on up the tree trunks and is lost so far as collection thereof concerned.

Since the bands 11 and 12 cover ⅓ of the external surface of the tubular body 10, and the bands 14 to 17 cover ½ of the external surface of the tubular body 13, ⅔ and ½, respectively, of the total area of the tubular bodies 10 and 13 is radiant-energy-transmissive for irradiation of the sap therein by the ultraviolet rays of the sun. This irradiation is particularly desirable because it retards bacterial action which discolors the sap and lowers the quality thereof. In addition to permitting solar irradiation of the sap, the transparent nature of the tubular body 10 permits observation of the interior thereof facilitating, for example, detection of any malfunction of the system.

The method of forming the improved tubing, and more specifically the tubing shown in FIGURES 1 and 2 will now be described. A dry blend premix for use in forming the tubular body 10 is made by mixing together and simultaneously heating polyvinyl chloride resin, liquid plasticizer and a non-toxic stabilizer. A dry blend premix for use in forming the bands 11 and 12 is made by mixing and simultaneously heating polyvinyl chloride resin, liquid plasticizer, a non-toxic stabilizer, N-alkyl phthalimide and carbon black. The premix for the tubular body 10 is then placed in the heated supply chamber of an extruding machine having a tube forming extrusion die, and the premix for the bands 11 and 12 is placed in the heated supply chamber of an auxiliary extrusion machine. The premix for the tubular body 10 is heated into a molten mass as is the premix for the bands 11 and 12, and the molten premix for the tubular body 10 is then forced through the tube forming die to form the tubular body 10. As soon as the tubular body 10 is formed, the molten premix for the bands 11 and 12 is forced from the auxiliary extruder and applied to diametrically opposite external surface portions of the formed tube in thin bands or ribbons as shown. Due to the elevated temperature of the formed tube and of the material of the bands 11 and 12 at the instant of application of said bands to said tube, said bands become fused to the tubular body 10 and become integral therewith. The operation is substantially continuous, with the bands 11 and 12 being applied to the tubular body 10 as fast as the latter is formed.

In the formation of the improvede tubing of the type shown in FIGURES 3 and 4, polyethylene is fed directly to the supply chamber of a tube forming extrusion machine, and the material for the bands 14 to 17 is formulated by mixing and simultaneously heating polyethylene with N-alkyl phthalimide and carbon black, the resultant formulation being fed to the supply chamber of an auxiliary extrusion machine. In a manner similar to the formation of the tubing shown in FIGURES 1 and 2, the straight polyethylene is heated to a molten state in the supply chamber of the tube forming extrusion machine and is formed by said machine into the tubular body 13. As soon as the tubular body 13 is formed, the bands or ribbons 14 to 17 are applied thereto, and due to the elevated temperature of the tubular body 13 and bands 14 to 17 at the instant of application of said bands, said bands become fused to the tubular body 13 so as to be integral therewith.

While the preferred forms of the invention are those shown in FIGURES 1 to 4, the inventive concept also includes a rodent repellent tubing in which a suitable rodent repellent, instead of being present only in longitudinally extending external bands or ribbons, is dispersed throughout the body of the tube such as the tubes 10 and 13.

Having thus described several specific embodiments of the invention and the methods of making the same, it is to be understood that the illustrated forms have been selected to facilitate the disclosure of the invention rather than to limit the number of forms which the invention may assume. Various modifications, adaptations and alterations may be made in the specific forms shown and in the practice of the method without in any manner departing from the spirit or scope of the present invention, and all of such modifications, adaptations and alterations are contemplated as may come within the scope of the appended claims.

What is claimed as the invention is:

1. A tube for use in a sap collecting system or the like, comprising a tubular body of fluid impermeable material having radiant energy transmissive portions permitting solar irradiation therethrough of the contents of said tube, said body also having infrared absorptive portions adapted to absorb solar infrared radiation and heat the contents of said tube.

2. A tube for use in a sap collecting system or the like, comprising a tubular body of fluid impermeable material having transparent and radiant energy transmissive portions permitting observation and solar irradiation therethrough of the contents of said tube, said body also having infrared absorptive portions adapted to absorb solar infrared radiation and heat the contents of said tube.

3. A tube for use in a sap collecting system or the like, comprising a tubular body of plastic material having radiant energy transmissive portions permitting observation and solar irradiation therethrough of the contents of said tube, said body including a band of infrared absorptive material extending longitudinally thereof adapted to absorb solar infrared radiation and heat the contents of said tube.

4. A tube for use in a sap collecting system or the like, comprising a tubular body of transparent, radiant energy transmissive plastic material having integral therewith and extending longitudinally thereof a band of infrared absorptive plastic overlaying a surface of said tubular body to absorb solar infrared radiation and heat the contents of said tube, the transparent and radiant energy transmissive character of said tube permitting observation and solar irradiation of the contents of said tube through the portions thereof not overlaid by said band.

5. A tube for use in a sap collecting system or the like, comprising a tubular body of transparent, radiant energy transmissive plastic material having integral therewith and extending longitudinally thereof a band of infrared absorptive plastic overlaying the outer surface of said tubular body to absorb solar infrared radiation and heat the contents of said tube, the transparent and radiant energy transmissive character of said tube permitting observation and solar irradiation of the contents of said tube through the portions thereof not overlaid by said band, said infrared absorptive band also being impregnated with a rodent repellent composition.

6. A tube for use in a sap collecting system or the like, comprising a tubular body of fluid impermeable material having radiant energy transmissive portions permitting solar irradiation therethrough of the contents of said tube, said body also having infrared absorptive portions adapted to absorb solar infrared radiation and heat the contents of said tube, said infrared absorptive portions containing a rodent repellent composition.

References Cited in the file of this patent

UNITED STATES PATENTS

| | | |
|---|---|---|
| 1,985,997 | Keeran | Jan. 1, 1935 |
| 2,319,802 | Dreyfuss | May 25, 1943 |
| 2,645,249 | Davis et al. | July 14, 1953 |
| 2,822,296 | Barrett et al. | Feb. 4, 1958 |
| 2,832,715 | Swarthmore et al. | Apr. 29, 1958 |